Figure 1:
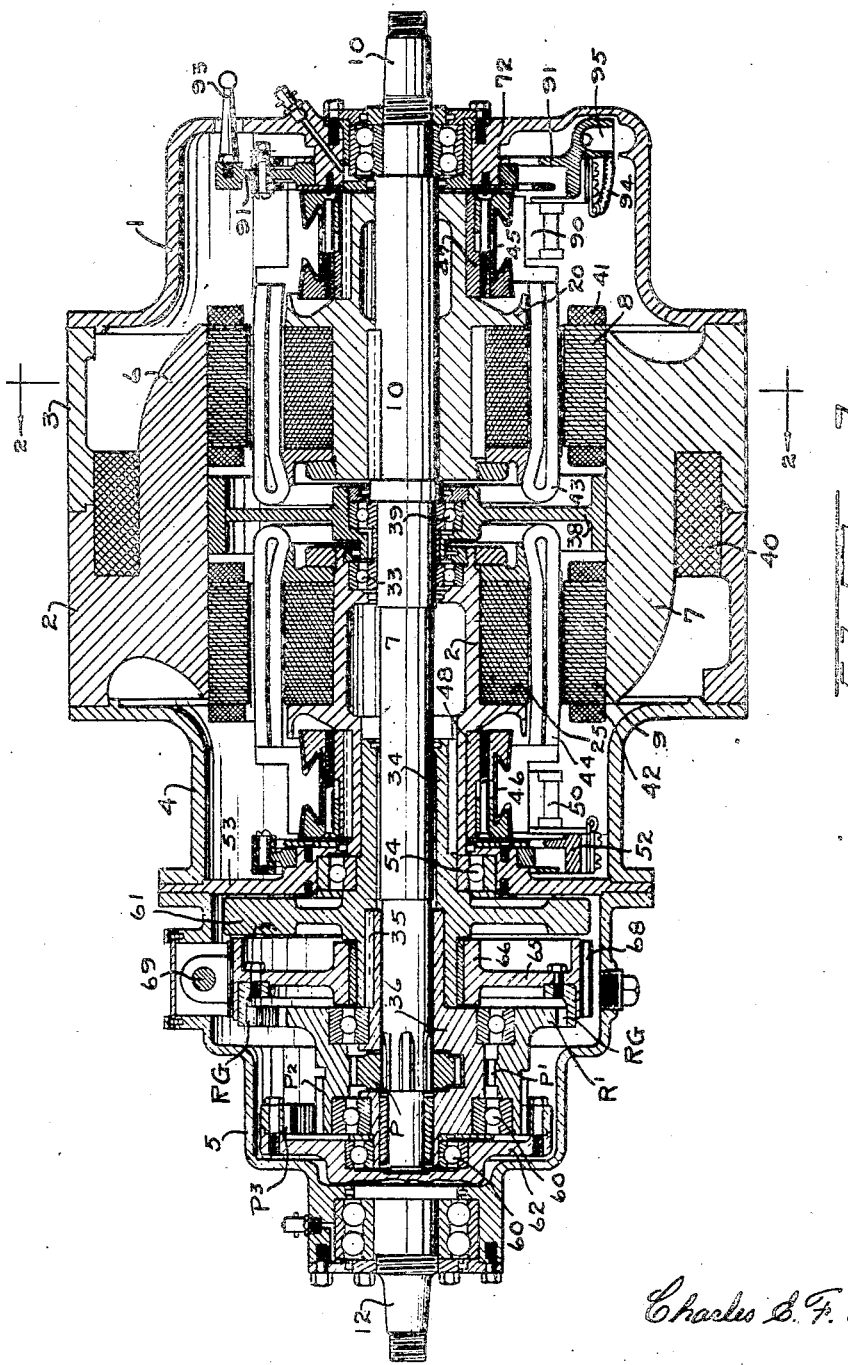

Nov. 4, 1930. C. E. F. AHLM 1,780,150
ELECTROMAGNETIC TRANSMISSION MECHANISM
Filed April 29, 1926 3 Sheets-Sheet 2
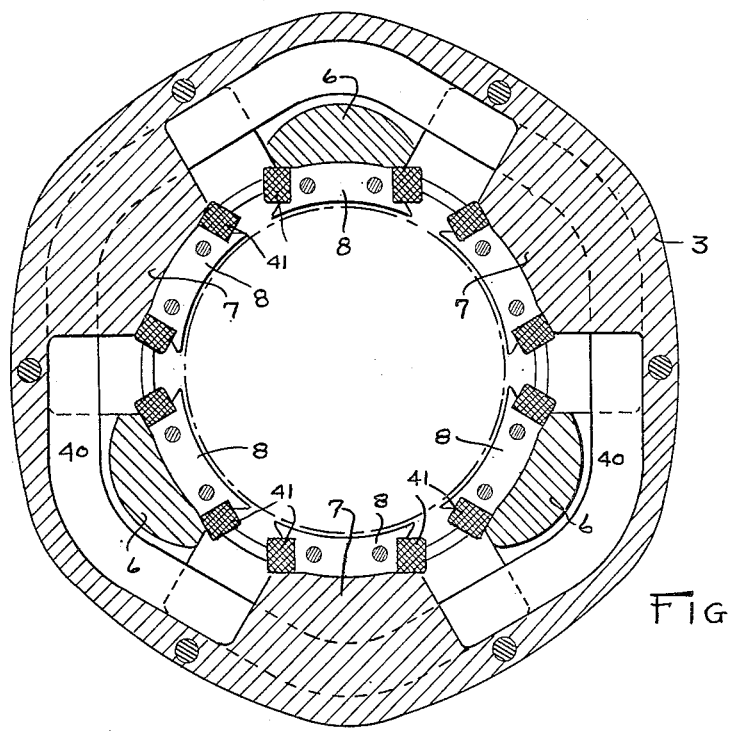
FIG.-2
FIG.-3
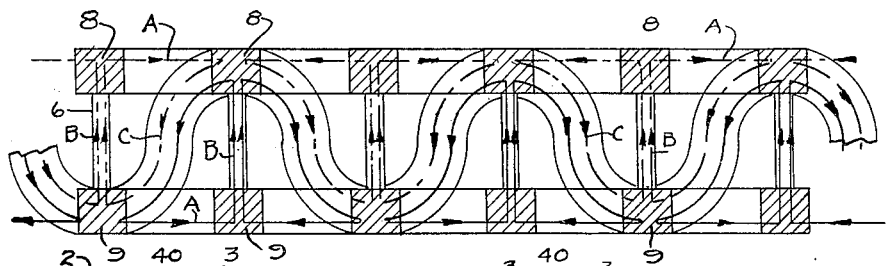
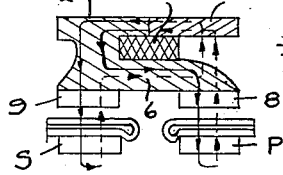
FIG.-4
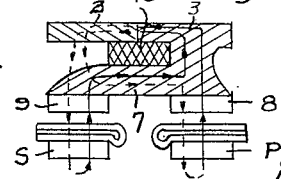
FIG.-5
Inventor
Charles E. F. Ahlm
By Bates Macklin Godrick & Teare
Attorneys Nov. 4, 1930.   C. E. F. AHLM   1,780,150

ELECTROMAGNETIC TRANSMISSION MECHANISM

Filed April 29, 1926    3 Sheets-Sheet 3

Inventor
Charles C.F. Ahlm
By Bates Macklin Golrick & Teare
Attorneys

Patented Nov. 4, 1930

1,780,150

UNITED STATES PATENT OFFICE

CHARLES E. F. AHLM, OF CLEVELAND, OHIO, ASSIGNOR TO CONTINUOUS TORQUE TRANSMISSION COMPANY, OF CLEVELAND, OHIO, A CORPORATION OF DELAWARE

ELECTROMAGNETIC TRANSMISSION MECHANISM

Application filed April 29, 1926. Serial No. 105,445.

This invention relates to electromagnetic transmission mechanisms of a type wherein there are primary and secondary dynamo electric machines and in which power is delivered from the engine to a driven shaft mechanically or electro-magnetically and at times both mechanically and electro-magnetically. This general type of electromagnetic transmission mechanism is shown in a prior patent granted to me and Harry Y. Hall, November 11, 1924, Patent No. 1,515,321. It is intended to use a controlling system of the same nature as shown in my prior patent of the same date, No. 1,515,322.

In the mechanical construction shown in the prior patent, certain difficulties were encountered in the cost of manufacture as well as in the operation of the primary and secondary armatures and field structures. For example, the armatures were a disc type, both operating in the flux of field poles at the sides thereof. These difficulties were particularly due to the large diameter of the armatures with relation to the speed to which they were subjected, which were dangerous and likely to burst by reason of centrifugal force. Also the arrangement was such that if suitable air gaps were selected for efficiency of electrical operation, the axial distortion of the armature, when subjected to the field flux, was such as to cause mechanical rubbing contact between the armature and an adjacent pole.

A further object of the present invention is to improve the arrangement of the electrical parts, and improve the controlling system to the end that more efficient operation is attained, and a more pronounced and definitely controlled overspeed of the driven shaft with relation to the driving shaft is made possible.

Other objects include further simplification and reduction of the size of the moving parts, particularly in the arrangement of the field and its windings, so that the primary and secondary armatures may be of a more usual construction and therefore, may be much smaller in diameter than the disc arrangements shown in the patent above referred to.

Other objects include specifically the arrangement of an economical and efficient field structure whereby a single field coil winding may create fields for both armatures. A simple and efficient arrangement of shunt or exciter coils may be provided to control each armature independently of the other thereby depressing the voltage of one armature while correspondingly raising it for the other, for the various relative speeds during acceleration and for the overspeed of the driven member.

Another important feature which affords many advantages over the construction of the patents referred to is that of the use in combination with these electrical mechanisms of an internal-external gearing instead of the gearing shown in those patents. This affords greater compactness, greater relative strength of gears, and provides a very quietly running mechanism. These improvements are accomplished without sacrificing by reason of this gearing, the various speed relations or variations to be desired.

The relative operation of primary and secondary armatures is similar to that described in my prior patent—the electro-magnetic units producing a reactive torque for the gearing. The secondary acts as a generator throughout substantially the entire time that it is running backwards being driven by the gearing and tending to come to zero speed. Meantime, the primary is acting as a motor, so that it is necessary to reduce the counter electro-motive force of the primary armature by shifting the brushes as described in my patent referred to. The means for shifting the brushes may be any suitable mechanism, such for example, as shown in this patent and accordingly, no such showing is made in the drawings of the present application.

I am enabled by the arrangement of the field structure and the smaller diameter standard type armatures to accomplish the above objects and make a very economical field structure and to avoid the difficulties incident to the side by side disc type. I find, however, that better flux conditions with minimum losses and better flux control between the primary and secondary is obtained. The operation of the exciter coils, independently controlled, gives greater flexibility in the changing of the relative strength of the fields, and as indicated, provides a positive and definite control of the overspeed when armatures with the same windings are employed.

Figure 6:
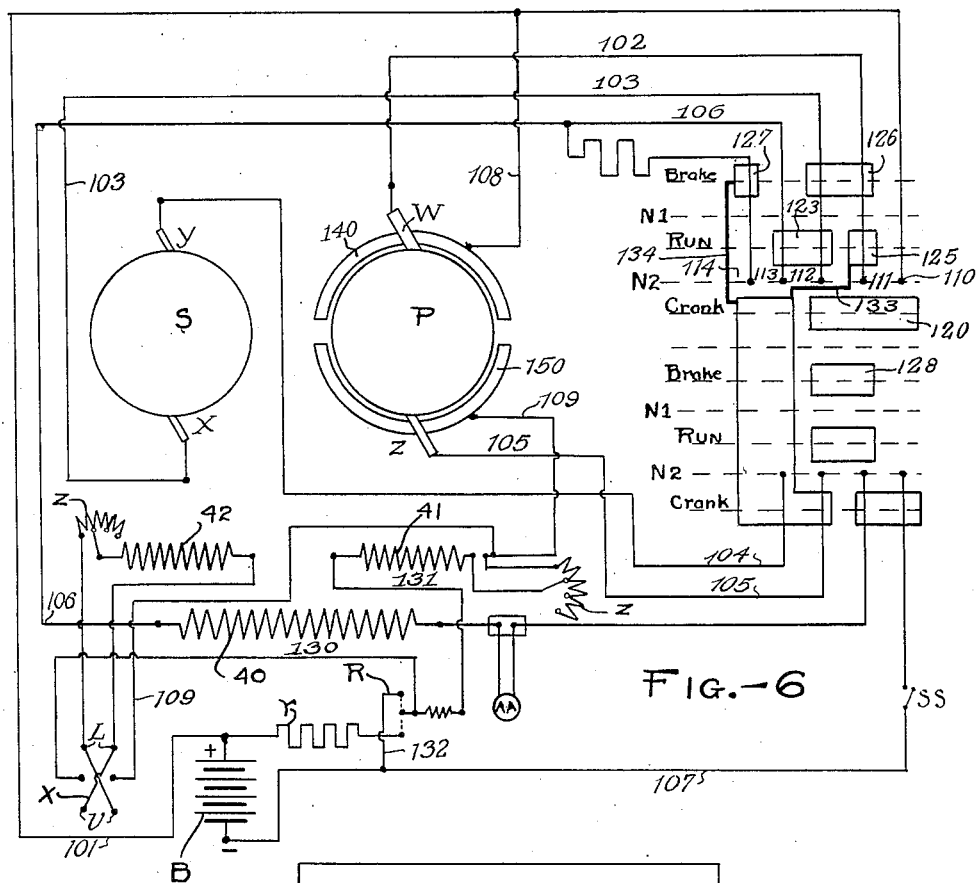
Figure 7:
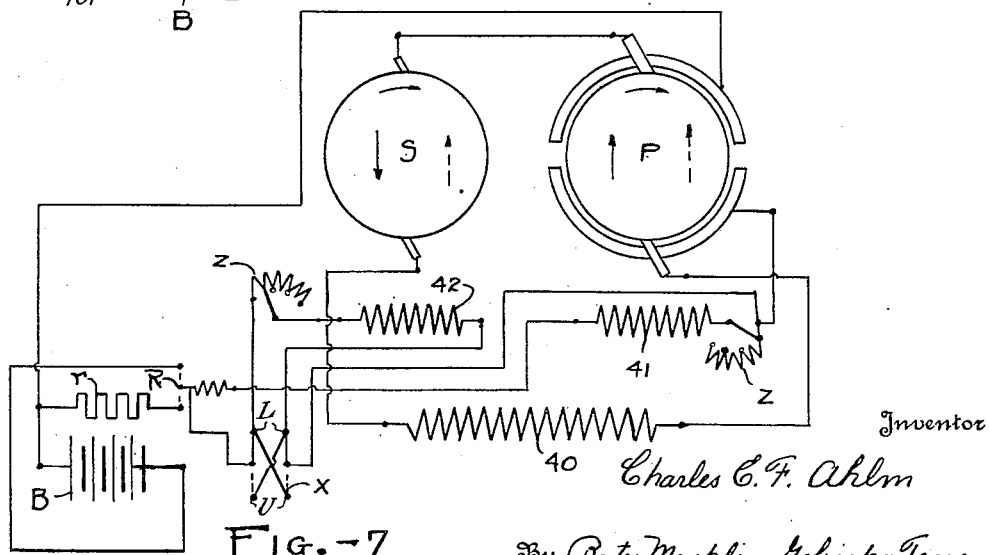

In the drawings Fig. 1 is a section taken along the longitudinal axis of the transmission mechanism, showing the field, armature, and brush arrangement and the combination with the gearing; Fig. 2 is a transverse section through the field structure taken substantially on the line 2—2 of Fig. 1; Fig. 3 is a diagram illustrating the field poles and the relative flow of the magnetic flux; Figs. 4 and 5 are transverse diagrammatic views of the field pole arrangements, showing the flux lines around the single main coil of the field; Fig. 6 is a wiring diagram illustrating the control and circuits therefor; Fig. 7 is a similar diagram showing a circuit condition that I term direct drive.

Referring to Fig. 1, the numeral 1 designates the forward portion of the casing structure, 2 and 3 designate dovetailed portions of the field structure comprising separate pole pieces; 4, a collar-like section or casing lying in the midportion of the device and 5, the rearward portion of the casing enclosing the gearing. The shaft 10 is adapted to be connected to the engine. The transmission gearing carries a driven shaft 12 which is connected with the propeller shaft of the vehicle; 20 indicates the primary armature unit which is mounted on and rigidly connected with the shaft 10. The secondary armature is designated at 25. The field structure for both these armatures, comprising the portions 2 and 3 with longitudinally extending pole members 6 and 7 respectively, in turn carry the faces 8 and 9 for the armatures 20 and 25 respectively. The secondary armature is mounted on a sleeve 27, surrounding the shaft 10 and relatively rotatable thereon within the field members. There is a disc-like support 38 embracing the inside surfaces of the field members 6 and 7 and surround the shaft and forming a support for the bearing 39, surrounding the shaft 10 adjacent to the bearing 39 and within the sleeve 27 is a bearing 33. The other end of the sleeve extends over and is keyed to the sleeve 34 which is, in turn, keyed at 35 to an eccentric bearing 36. The bearing 36 is rotatable about the shaft 10 and forms a part of the internal-external gear mechanisms to be later described. Within the field casing members 2 and 3 and embracing the offset pole members 6 and 7, is a main winding 40, exciting and creating a field for both armatures 20 and 25. Around the pole faces 8 and 9, I have shown shunt windings 41 and 42 which are in the nature of exciting coils adapted to be independently controlled as will presently appear. The armature conductors are in the nature of swing loops or coils indicated at 43 and 44 for the primary and secondary armatures respectively. These terminate in the commutator bars 45 and 46, mounted in suitable ring-like supports 47 and 48. The commutator brushes indicated at 50 for the secondary armature may be mounted on a suitable supporting ring 52 rigidly carried by the disc member 53. The disc 53 embraces the bearing 54 and has its periphery clamped between flanges of the members 4 and 5. The commutator brushes as at 90, for the primary armature are shiftable about the commutator and are carried by the disc-like member 91, rotatably mounted upon the hub 92 of the casing member 1. These brushes may be shifted by rotating this disc by mechanism such as for example, as shown in my prior patent above named. I have shown merely a member 93 projecting outwardly in a slot in a casing member to which such a shifting mechanism may be connected. Leads to the brushes 90 are indicated at 94 and may be allowed to lie in a suitable arcuately grooved member as at 95.

Describing the gearing which connects the propeller shaft with both the engine shaft and the secondary armature sleeve, I will first refer to my pending application, Serial No. 758,940 filed December 30, 1924, since issued on March 15th, 1927, as Patent No. 1,620,854, which is directed to such a gearing construction with modifications thereof. For convenience, I will briefly refer to the arrangements herein shown. Briefly, this gearing comprises a connection between the driving member 10 and the driven shaft 12 and the secondary armature 25, and provides for a reduction of speed or reversal of the member 12 relative to the member 10.

On the shaft 10, is a pinion P rigid therewith and meshing with an internal gear $P^1$, which is formed on a composite gear member which composite gear member also has an external gear $P^2$. This composite gear is hereinafter referred to as an internal-external gear and is preferably carried upon separated bearings designated 60 and a support on the rotatable eccentric bearing member 36, which is described as surrounding the driving member. I show a balance wheel 61 having its mass arranged to provide dynamic balance for the eccentric bearing 36. The gear $P^2$ is shown as meshing with the internal gear member $P^3$ rigid with a flanged disc-like member 62 and in turn, rigid with the propeller shaft 12. By reason of the secondary being directly mechanically connected to the eccentric bearing 36, it is obvious there will be no relative rotation of these gears when the eccentric bearing is driven at the same speed as the driving shaft and pinion P whereby an approximation of direct drive will be attained. A reduced speed of the propeller shaft 12 with relation to the shaft 10 with corresponding increase of torque takes place when the eccentric bearing 36 is either held from rotation, retarded or reversed by correspondingly controlling the secondary armature. Under these conditions the driving pinion P drives the composite gear through the gear $P^1$, affording a reduction between these two members; the gear $P^2$ meshing with the gear $P^3$ gives a further reduced speed to the shaft 12.

Reverse of the propeller shaft is accomplished by actuating the brake 68 to hold the member 65 and gear RG against rotation. This prevents free rotation of the composite gear while leaving the eccentric free to circulate, carrying the composite gear about the axis of the shaft 10, causing a creeping backward of the composite gear within the gear RG, and correspondingly delivery of slow backward motions to the gears $P^2$ and $P^3$ to the propeller shaft member 12. From a full reverse up to a coincidence of speed between the driving and driven members 12, the secondary is rotating with the eccentric bearing 36 first more rapidly than the primary and in a reverse direction, then decreasing in speed to zero, then increasing in speed in the same direction as the primary. To approach direct drive the brake 68 is released and the member 65 rotates freely while the secondary 25 is brought to a stop and then to approximately the same speed as the primary, with the result that the composite gear and eccentric bearing have no relative rotation and the gear mechanism is idle except to bear the load of direct transmission.

A choice of speed ratios found to have been practical, has been described in my Patent No. 1,620,854 above designated, the ultimate speeds, however, may vary from those embodied there by reason of the variation incident to the relative speeds of the primary and secondary of the electrical machine, which are here substituted for the brake and clutch mechanisms of the arrangements shown in Fig. 1 of my patent.

It will be seen that while running, the propeller shaft is driven from the main shaft 10 mechanically through the gearing and electro-magnetically through the dynamo machines, by reason of the secondary reacting through the gearing and electrically driving the primary so that the primary augments the engine torque directly and the secondary converts the mechanical reactive torque into electrical energy for the primary when the secondary dynamo is being driven in a reverse direction. On the other hand, the drive is both mechanical and electro-magnetic when both dynamos are operating in the same direction, for then the primary is acting as a generator and electrically driving the secondary which in turn augments the torque given to the eccentric bearing, which in turn adds to the power delivered by the driven shaft. Thus it follows that the power delivered to the propeller shaft may be varied within the range of the mechanism by simply electrically balancing the relative intake or output of the primary and secondary dynamos. This variation is accomplished as in the Patents Nos. 1,515,321 and 1,515,322 referred to, by shifting the brushes of the primary machine to various positions, as will be again referred to in connection with the diagrams. In my prior patents, I have set forth certain illustrative speed results and mutual relationships and I find that these may be considered as equally illustrative of the speeds of the ratios of my present mechanism. Although as stated, the gearing relationships may vary somewhat if the relative sizes were to be selected in accordance with those given in the gearing patent referred to.

The number of armature turns for each armature is preferably equal. The strength of the field for each armature is normally equal except as changed by the exciter coils 41 and 42. In referring to the wiring diagram in Figs. 6 and 7, the primary and secondary armatures are indicated by the letters P and S respectively. The field coils 40, 41 and 42 correspond to the parts previously described. At the right of Fig. 6 appears diagrammatically, a controller shown in neutral position indicating the contact connections for the various conditions of cranking, running, braking, etc.

With proper connections, as provided, the battery current may be used to operate both dynamos as motors to crank and start the engine. There are certain positions as in the arrangement of the control, shown in my prior patents where both units operate as generators and another position wherein one may oppose the other to produce a braking action. It will be seen that the storage battery B is protected from discharging by the transfer relay R, such as described and claimed in my Patent No. 1,352,166 issued to me September 7, 1920. This relay is effective to prevent connection to the battery until a sufficient current is flowing in a direction to properly charge the battery. I show at $r$, Figs. 6 and 7 a rheostat connected in parallel with the battery through the relay R. This rheostat is designed to have a resistance equal to the internal resistance of the battery so that as the battery is cut in or out of the circuit, the rate of flow of current will not be disturbed.

When the secondary is rotating in the reverse direction, the maximum voltage of the secondary greatly exceeds the voltage of the primary, affording a high flow of current through the two dynamos greatly facilitating the starting of the vehicle. In order to continue the flow of current by using the secondary as a generator, returning power to the primary as a motor during the entire time that the secondary is running backwards relative to the primary, it is necessary that the internal voltage of the primary be continually reduced. As in the patent referred to, this is accomplished by shifting of the primary brushes by movement of the brush carrier 91 as described. Bearing in mind, that the primary armature continues its rotation in the same direction, there comes a period when the primary brushes are in neutral position at a time when the speed of the secondary armature is very near absolute zero. During this time, the brushes are continually moved in the same direction toward a position under poles opposite those under which the brushes lay in the starting position. Thus the character of the primary unit is changed from a motor to a generator. In the meanwhile the secondary armature, passing through the point of zero speed, attains speed in the same direction in which the primary moves, and by virtue of the reversing of the direction of rotation changes its characteristic also, but from a generator to a motor. As a motor, it is able to draw current from the primary unit by reason of its slower speed and by reason of the continued advance of the brushes of the primary unit. In this manner, the two armatures tend to arrive at a condition of balance at approximately the same speeds when the primary brushes are directly under the pole pieces which they approached after the change through neutral.

The connections of each of the circuits shown in Fig. 6 for different controller positions are further described in my prior Patent No. 1,515,322. It will be noted, however, that the series field coil comprises one unit as indicated at 40 and that I provide rheostat control for each of the exciter coils 41 and 42 respectively.

To effect an overspeed of the secondary armature with relation to the primary, I provide means in the nature of a reversing switch X. By use of the reversing switch with or without the rheostats Y and Z, I can effectively reduce the field strength of the secondary unit to obtain the overspeed condition described.

For a clearer understanding of the action of the flux in the fields and armatures, I will now refer to the diagram of Figs. 3, 4 and 5. The shaded portions 8 and 9 indicate the pole faces for each armature. Parallel lines A embracing them, correspond to the paths of flux through the body of the armatures along which the flux flows. The sinuous lines C imposed over the shaded portion and pole pieces, correspond to the paths of flux through the casing portions of the field structure and the transverse lines B correspond to paths of flux through pole members 6 and 7. For the purpose of describing the diagram, assume that the coil 40 lies between the pole pieces 6 and 7 indicated at B, Fig. 3, and casing portions 2 and 3 indicated at C. Assume that the flux created about the coil 40 will flow counter-clockwise relative to the section in Fig. 4. Then beginning at a point to the left of the coil 40, as shown in Fig. 4, it will be seen that flux flows downwardly but diverges in two paths. One path leads directly to the armature 25 and the other path leading through the pole piece 6 through the pole face 8 into the armature 20. The flux then flows independently through each armature to the next adjacent poles. But, as indicated by the dotted lines in Fig. 4, the path of the flux is shown as continuing from the armatures back into the next adjacent pole piece. In Fig. 5, I show the next adjacent pole piece 7 with the path of flux from the armature shown in solid lines where one path comes from the armature 25 and passes through the pole face 9 and then passes axially through the pole piece 7 to the right as shown in Fig. 5, until that path joins the path of the flux returning from the armature 20 through the pole face 8 upwardly to the right of the coil 40, shown. Thus, the two paths join to form a common path directed towards or away from the center of the machine in the alternate radial portion of the pole pieces. The path of the flux continues in a counter-clockwise direction about the coil 40 through the casing portions 2 and 3, but diverges beyond the radial portion of the pole piece 7 and seeks two paths through the casing portion, each path entering again in the radially extending portion of the pole pieces 6. In Fig. 3, I picture the poles and armatures as being stretched out and laid in a plane. I view Fig. 3 with the upper portion representing the forward portions of the machines as they lie in the vehicle. Thus, at M, I look down upon the casing portion 3 as shown at the top of the drawing in Fig. 1, and at N, I look down upon the exterior of the casing directly above the pole tip 8 adjacent thereto and to the right of the uppermost pole shown in Fig. 1. With regard then to the path of the flux as described with relation to Figs. 4 and 5 in the lower left hand corner of Fig. 3, one finds the path of the flux passing downwardly through the radially extending portion of the pole piece 6 down through the pole tip 9 and into the armature 25. The then diverging path of flux at this point passes upwardly as shown in Fig. 3 along the path B through the axially extending portion of the pole piece 6 down through the pole face 8 into the armature 20. In both armatures the path A indicates the path of the flux to the right as shown in Fig. 3, then back up through the pole faces 8 and 9 respectively. From the pole face 9, the flux flows axially along the pole piece as indicated by the path B, the two paths converging below the point N. The paths join in the radially extending portion of the pole piece 7 and come away from the center of the machine toward the point N on the exterior of the casing and then diverge along the paths shown at C, thence through the outer casing portion back to the point of starting.

Thus it will be seen that the flux lines have been created around a common field coil and in a composite field structure and may be varied with relation of one to the other by the exciter coils, that is, the depressing or increasing of the density of the flow lines through the pole portions 8 will correspondingly effect, by increasing or depressing the lines of flow through the pole portions 9.

In Fig. 7, I indicate by diagram the connections used in normal running position with both armatures running in the same direction. The primary unit acting as a generator is indicated by the solid and broken arrows representing the directions of the internal and external electromotive forces respectively building a potential in the same direction. The secondary is operated as a motor, as indicated by the solid and broken arrows facing in opposite directions, indicating the external electromotive force opposed to the internal electromotive force. Regarding the heavier brush of the primary unit as the positive brush, the flow of current may be traced from that brush through the secondary unit and directly through the common series field 40, back of the negative primary brush. The shunt or exciter coils are normally connected in parallel with each other across the brush rings of the primary unit. Thus in normal running condition with the rheostats Y and Z short circuited or fixed at predetermined values, fields of equal strength may be provided for both units. If, however, the flow of current through the exciter coil 42 is reversed by operating the switch X, a negative compounding effect is produced upon the secondary armature. Since the series field is common to both armatures and since the series field current is maintained approximately constant, under given conditions, the flux, due to the series field coil, remains approximately the same and since its path is impeded by the negative magnetomotive force of the reversed exciter field coil 42, there will tend to be a greater flux imposed upon the primary field through the pole faces 8 at the expense of flow of flux through the pole faces 9. It will readily be seen that when the flow of current through the coil 42 is in the same direction as coil 41, approximations of the condition just described may be effected by including all or part of the rheostat Z in the circuit with the coil 42. In the early accelerating stages when the primary is acting as the motor and the secondary is acting as a generator, and increased flow of current with increased torque can be effected by including the rheostat Y in the circuit with the coil 41.

Referring particularly to Fig. 6, I will briefly trace the paths of the current through the circuits and through the controller for the conditions of cranking, running and braking. Two neutral positions are shown which merely indicate that the circuits are open.

To start the prime mover, it is desired to drive the armatures in opposite directions so that the primary armature moves the driving shaft in its normal running direction and the secondary armature drives the eccentric bearing 36 in the opposite direction to cause the composite gear to move the pinion P in the same direction as the primary armature and the driving shaft, the propeller shaft 12 being stationary. To accomplish this, the starter switch SS is closed and current flows from the positive side of the battery B through the line 101 to the contact point 110, through the controller bar 120, through the contact points 111 and 112, through leads 102 and 103 to the brushes W of the primary and X of the secondary respectively, thence through the dynamos and back to the controller, through the lines 104 and 105 to the contact points 115 and 116 to the controller bar 121, thence to the contact point 113 through the lead 106 to the series field 40, through the ammeter AA, thence to the contact point 117 through the controller bar 122 through the contact point 118 through the lead 107 and the starter switch SS to the negative terminal of the battery.

Meantime, current flows from the positive terminal of the battery through the resistance $r$, through the relay R branching through the lines 130 and 131, the current through the line 130 passes through reversing switch X through the contacts L and through the field 42 and into the line 109, the current in the line 131 passing directly through the exciter or shunt field 41, thence into the line 109 to the negative brush ring in the primary armature, thence through the brush Z, line 105, the contact point 116, the controller bar 121, contact point 113, line 106 through the series field 40, contact point 117, controller bar 122, contact point 118, starter switch SS, lead 107 to the negative terminal of the battery.

After the prime mover is started, the controller is shifted to neutral position indicated $N^2$ which opens to electrical circuits; the starter switch SS being opened and permitted to remain open. While in neutral the brushes of the primary armature are shifted through 180 electrical degrees to be ready for the first period of acceleration. The brush shifting has been described on the preceding pages, so for the present paragraph I will proceed to trace the flow of current according to the diagram in Fig. 6, due regard being had for the shifting of the brushes. In the neutral position and in the initial period of acceleration, the secondary is rapidly revolving in a reverse direction, being driven through the eccentric bearing 36. The secondary acts as a generator to deliver current to the primary which acts as a motor and aids in the driving of the shaft 10. Thus, in the initial running position, the direction of rotation of the armatures is opposite, the secondary delivering current through the brush X through the line 103 to the contact point 112, through the controller bar 123, through the contact point 113, lead 106, series field 40, ammeter AA to the contact point 117, through the controller bar 124, thence through the contact point 116, through the lead 105 into the primary armature through the brush Z, thence through the brush W via the lead 102, contact point 111, controller bar 125, controller connection 133, through the controller bar 121, thence to the contact point 115, lead 104, secondary brush Y, thus completing the circuit.

During this period, the primary brush Z has the higher potential but since the brushes have been shifted through 180 electrical degrees, the relative position of the brushes Z and W are changed from that shown in the diagram in Fig. 6, so that current may flow from the brush Z through the brush ring 140 through the lead 108 instead of the lead 109. Current flowing through the lead 108 flows through the lead 101 across the positive battery terminal through the resistance $r$ to the relay R, thence branching into the lines 130 and 131, part passing through the reversing switch SS across the contacts L through the field 42 and into the line 109, the other part passing through the field 41 in the same relative direction and through the lead 109, thence through the brush ring 150, with which at this point, the brush W is in contact, thence through the line 102, contact point 111, controller bar 125, controller connection 133, controller bar 121, contact point 115, lead 104 and returning through brush Y to the secondary armature. It will be noted that the shunt or exciter field current passes across the positive terminal of the battery so that when the generated voltage drops off as the primary brushes cross neutral and after the secondary armature comes to zero speed, the shunt fields may be excited by the battery as governed by the relay R.

It has been pointed out in the foregoing that as the acceleration increases, the brushes on the primary armature are shifted until they come to neutral at about the time the secondary armature reaches zero speed. Continued shifting of the brushes changes the character of the primary armature to a generator, and the secondary armature changes its direction of rotation and becomes a motor. During this change, the controller is left in running position, the flow of current will appear as follows, it being borne in mind that both armatures are rotating in the same direction.

After the brushes are shifted the point of highest potential is the brush W (now contacting with the ring 140) of the primary armature, so that the current flows from the brush W through lead 102, contact point 111, controller bar 125, controller connection 133, contact point 115, lead controller bar 121, contact point 115, lead 104, secondary brush Y through the secondary armature, brush X, lead 103, contact point 112, controller bar 123, contact point 113, lead 106, series field 40, ammeter, contact point 117, controller bar 124, contact point 116, lead 105, thence to the negative primary brush Z. Meanwhile, the shunt fields receive current from the positive primary brush ring 140 through the lead 108, lead 101, thence either through the battery to charge it via the relay R, or through rheostat $r$ and relay R, as directed by the relay. In either event, the current continues through the leads 130 and 131, one passing through the reversing switch X via the contacts L and the field 42, and the other passing through the field 41, the paths uniting in the lead 109 and coming to the negative primary brush ring 150. It has been pointed out in the foregoing that in its normal running condition the field strength of the shunt fields 41 and 42 may be varied by the rheostats Z. It is further pointed out that the direction of the flow of current through the field 42 may be reversed by using the contact points U of the reversing switch X instead of the contact points L. In the event the contact points U are used, the secondary unit is under-compounded. Under-compounding the secondary when it acts as a motor gives an over-speed to the shaft 12. Reference may also be had to Fig. 7 to show this particular circuit condition.

To use the electrical apparatus as a brake, the dynamos are opposed, by moving the controller to the position marked "Brake." The primary brushes are left undisturbed in their normal running position. Voltage is forced upon the secondary to oppose its rotation, which has been in the same direction as the primary, to bring the secondary armature first to a stop and then to rotation in the opposite direction. As the car slows down, the secondary may rotate more rapidly in its reverse direction until the driven shaft 12 comes to zero speed. A further increase in the negative speed of the secondary armature will cause the driven shaft 12 to rotate in a reverse direction. For the purpose of braking, however, the controller may be thrown to neutral when the vehicle is stopped. The flow of current under braking conditions may be traced as follows:

Since the primary is still acting as a generator and continues to revolve in the same direction, the current will flow from the brush W through the line 102, contact point 111, controller bar 126, contact point 112, line 103, to the secondary brush X, through the secondary armature, thence through the secondary brush Y, line 104, contact point 115, controller bar 121, controller lead 134, controller bar 127, contact point 114, through grids RR, thence through line 106, the series field 40, contact point 117, controller bar 128, contact point 116, lead 105, returning to the primary armature through brush Z. The fields 42 and 41 are shunted through lines 108, 101, 130 and 131, and 109 as described above, the battery B being charged under the control of the relay R.

Having described the paths of the current for the various conditions of operation, I will now describe the paths of the flow of power through the structural arrangements, reference being had particularly to Fig. 1. To begin acceleration of the vehicle, the primary armature delivers torque in a positive direction to the shaft 10, which is also driven in a positive direction by the prime mover. The shaft 10 drives the pinion P in a positive direction, which in turn drives the gear $P^1$ in a positive direction, the gear $P^2$ following in the same direction and driving the internal gear $P^3$, or at least beginning to drive the internal gear $P^3$ which is secured to the shaft 12, in a positive direction. The reaction between the pinion P and the composite gear $P^1$—$P^2$ is borne through the eccentric bearing 36 which is squeezed around in a negative direction, carrying with it the secondary armature S. The torque delivered by the eccentric bearing is converted into electrical energy in the secondary unit which delivers current to the primary armature by the circuit arrangement mentioned above. As the vehicle gains speed the shaft 12 and the gear $P^3$ tend to approach the speed of the gear $P^2$ so that a point is reached when the eccentric bearing comes to zero speed. At this point the speed of the driven shaft has relation to the speed of the driving shaft measurable by the ratio of the number of teeth in the gear $P^3$ to the gear $P^2$ and in turn by the ratio of the number of teeth in the gear $P^2$ to the pinion P. As pointed out above, at about this time the primary brushes are shifted past neutral so that the primary acts as a generator and the secondary acts as a motor. The function of the secondary is to drive the eccentric bearing in a positive direction until the speeds of the pinion P and the gear $P^3$ are substantially equal. During this period the shaft 10 delivers torque both to the primary armature and through the pinion P to the composite gear $P^1$—$P^2$. The torque delivered to the primary armature is converted into electrical energy, and in turn delivered to the secondary armature to drive the eccentric bearing 36 in a positive direction so that both the eccentric bearing 36 and the pinion P compound torque in a positive direction, delivering it to the internal gear $P^3$. The speed relation between the shaft 10 and shaft 12 depends upon the torque delivered by the secondary armature to the eccentric bearing.

In direct drive, pinion P, composite gear $P^1$—$P^2$, and the eccentric bearing 36 revolve as a unit, torque being delivered from the pinion P and from the eccentric bearing 36 to the composite gear $P^1$—$P^2$. As is pointed out above, an overspeed is effected by reducing the flux density of the secondary field and causing the secondary armature to rotate in a positive direction at a higher speed than the primary armature. This causes the eccentric bearing to rotate in a positive direction at a higher speed than the shaft 10, and pinion P, so that the eccentric bearing has a positive rotation relative to the shaft 10. Both the pinion P and the eccentric bearing deliver positive torque to the internal gear $P^3$ and the driven shaft 12. The electrical machines deliver a higher percentage of power during the overspeed than during direct drive.

To effect a braking action through the electrical machines, the controller is moved as indicated above to oppose the primary and secondary units. The result of this opposition is to cause the secondary to decrease in speed, then come to zero and proceed to gain speed in a negative direction until the driven shaft is brought to a stop; then the circuits are opened or the driven shaft is caused to rotate in a reverse direction. The torque and power relationship in the structure is as follows:

The driving shaft 10 continues to deliver torque to the primary armature in a positive direction and also to the pinion P in a positive direction. The shaft 12 now operates as a driving shaft, as driven by the wheels of the vehicle, and delivers torque to the gear $P^3$ in a negative direction while it is rotating in a positive direction. The result of the negative torque on the gear $P^2$ and the positive torque on the pinion $P^3$ cause the composite gear $P^1$—$P^2$ to deliver positive torque to the eccentric bearing 36 and drive it in a positive direction. The power delivered from the primary armature is directed to the secondary armature to oppose the motion of the eccentric bearing so that the secondary armature tends to impose negative torque on the eccentric bearing to cause a retardation in the speed rotation of the shaft 12. The secondary armature continues to deliver negative torque until its speed is reduced to zero and then continues to deliver negative torque while gaining speed in a negative direction, continuing to oppose the rotation of the eccentric bearing until the speed of the shaft 12 is reduced to zero. It has been pointed out before, in describing the initial acceleration period, that the eccentric bearing may revolve rapidly in a negative direction while the shaft 10 moved in a positive direction, when the vehicle is standing and the shaft 12 is at zero speed.

A feature of this character of transmission such as the present invention, as well as that of my prior patent and the Ahlm and Hall patent heretofore designated, is the utilization of kinetic energy stored up in the rapidly rotating secondary armature, the balance wheel member 61, the eccentric bearing and other parts. This condition obtains when the drive shaft is stationary and the motor is running with the circuit open. When the circuit is closed to start the car during the period of acceleration, these rapidly rotating heavy parts are brought quickly to a stop by reason of the secondary acting as a generator, in turn boosting the rotation of the primary, for several seconds in actual practice. Whereas with other forms of transmission mechanisms of this general type wherein the secondary and primary are not so connected through such gearing as to require the secondary to act as a reactionary member with an initial high speed, the opportunity to utilize the kinetic energy of these parts does not exist. In this character of mechanism the speed of rotation of these heavy parts, including the secondary armature, is very high and a structure such as shown in the drawing may have the armatures say 16″ in diameter for truck or buss transmission mechanisms.

The moment of greatest required torque is the starting of the vehicle from a dead stop. At this moment, by the circuit arrangement described, the secondary is utilized as a generator with diminishing energy, beginning at the point of highest speed down to the time when it ceases to rotate and starts in the other direction becoming a motor, as described. The electrical energy is derived from the momentum of the secondary armature and connected members as its speed diminishes, but in this interval the vehicle has been started and is brought well into its acceleration period, a very substantial part of the energy used in starting the vehicle having been derived from this momentum of the secondary armature and its connected parts. This energy in actual practice is known to develop a considerable number of horse power at the time of first closing the circuit through the secondary. This feature affords a marked advantage over the motor generator type of transmission, for example, wherein the generator has the inertia of the motor as well as the vehicle to overcome at the beginning of movement of the vehicle and any loss of speed of such a generator is merely coincident with the loss of speed of the prime mover.

I claim:

1. In a change speed gearing, the combination of two armatures, a common field therefor, a driving member connected with one armature, a driven member having a gear rigid therewith, a gear on the driving member and an internal external gear meshing with both said gears, an eccentric bearing for said internal external gear revoluble with and rigidly connected to the other armature.

2. In a change speed gearing, the combination of two armatures, a driving member connected with one armature, a driven member having a gear thereon, an internal external gear driven by the driving member and a revoluble eccentric bearing for the internal external gear permanently connected in one to one ratio with the other armature.

3. The combination of a driving member, a primary armature rotating therewith, a driven member having a gear thereon, a secondary armature, an internal external gear meshing with the gear on the driven member, an eccentric bearing therefor connected with the secondary armature and constrained to rotate therewith, and a gear on the driving member also meshing with the internal external gear.

4. The combination of a driving member having a gear thereon, a primary armature rotating therewith, a driven member having a gear, a secondary armature rotatable in either direction, an internal external gear meshing with the gears on the driving and driven members, an eccentric bearing drivingly rigid with the secondary armature and means controlling the electrical relationship of the armatures including shiftable brushes on the primary armature.

5. The combination of a driving and driven member, a primary and secondary armature, one of said armatures being rigidly connected with one of said members, an internal external gearing with an eccentric bearing for an intermediate member thereof, rigidly connected to the other armature, series and shunt field windings for said armatures and means responsive to either armature for exciting the shunt field windings of both armatures.

6. The combination of a driving member, brushes therefor, a primary armature rotating therewith, a driven member having a gear, a secondary armature rotatable in either direction, shunt fields for said armatures, an internal external gear meshing with the gears on the driving and the driven member, an eccentric bearing carrying said internal external gear and being in one to one ratio driving relation with the secondary armature, whereby the reactive torque imposed upon said eccentric bearing varies the speed relation between the driving and driven members, and means controlling the flow of current through said armatures adapted to vary the torque imposed upon said bearing.

7. A device according to claim 6 having a single series field coil common to both armatures wherein the reactive torque imposed upon the eccentric bearing may be varied by under-compounding the shunt field aforesaid of one armature independently of the other armature, and means for so under-compounding such shunt fields.

8. A device according to claim 6 wherein the torque imposed upon the eccentric bearing may be varied by changing the shunt field strength of the aforesaid shunt fields of either or both armatures independently of the other.

9. In a change speed gearing, the combination of two armatures, a field therefor, a driving member connected with one armature and having a gear member rigid therewith, a driven member having a gear rigid therewith, a change speed gearing including a composite gear and an eccentric bearing therefor, the latter rigidly connected with the other armature and means acting to retard the rotation of the composite gear for causing a reverse of direction of rotation of the driven member while the eccentric bearing revolves rapidly in the reverse direction.

10. The combination of a driving and driven member, of a primary and secondary armature, each adapted to excite a field winding for both armatures and gearing connecting one of the armatures with the driven member, said field comprising a common coil surrounding both armatures, a casing surrounding the coil and field, pole carrying members rigid with the casing and extending in opposite directions within the coil, each of said members carrying pole faces for each armature.

11. The combination of a driving and driven member, a pair of armatures one rigid on the driving member and the other connected with the driven member, a common field coil therefor lying in an annulus about the machine, pole carrying members extending over both armatures alternately in opposite directions beneath the coil and connecting around the coil.

12. The combination of a driving and driven member, a pair of armatures, one rigid on the driving member and the other connected with the driven member, a common field coil therefor, pole carrying members extending over both armatures alternately in opposite directions beneath the coil and connecting around said coil, each of said pole carrying members having two pole pieces, each of which pole pieces lie adjacent the periphery of each of said armatures and coils about each pole piece for separately exciting each armature.

13. The combination of a driving and driven member, a pair of armatures, each armature separately connected to one of said members, a common field structure for said armatures, one field coil having an axis coincident with the axis of said armatures, and a plurality of other field coils having their axes normal to the axes of said armatures, the pole pieces of said field structure being dove-tailed from alternate sides between the first named coil and the peripheries of said armatures and providing a path for flux longitudinally as well as radially of said field.

14. The combination of a driving and driven member, gearing connecting said members, a pair of armatures, one rigid on the driving member and the other connected with the driven member through said gearing, a common field coil therefor, pole carrying members extending over both armatures alternately in opposite direction between the coil and the armature surfaces, spaces provided on each of said pole carrying members adjacent each armature, exciter coils disposed adjacent each of said faces and means adapted to independently vary the current in the exciter coils adjacent one armature independently of the other coils.

15. The combination of a driving and a driven member, gearing between said members, a pair of armatures, one armature connected to one of said members, the other armature connected through said gearing, a common field structure for said armatures, said structure carrying a common field coil with its axis lying in the axis of said armatures, said structure also carrying separate field coils at each pole for each armature, said structure comprising alternately disposed pole pieces having longitudinal and radial portions adapted to provide paths for flux around said first named coil and through the alternately disposed radially extending portion of each pole piece adjacent said last named coils.

16. In a gearing, a driving member having a gear, a driven member having a gear, a composite gear having separate sets of teeth meshing respectively with the previously mentioned gears, a revoluble eccentric bearing for the composite gear, means for rotating the driving member in a given direction and an electro-magnetic device and control means therefor arranged for rotating the eccentric bearing in the same direction at a greater speed.

17. In a gearing, a drive shaft having a gear, a driven shaft having a gear, a gear meshing with both said gears and having its axis displaced from the axis of said drive shaft, and an electro-magnetic device and connections therefrom for moving said last named gear so that its axis moves about the axis of the drive shaft in a positive direction relative to the rotation of the drive shaft and at a greater speed than said drive-shaft.

18. The combination of a driving member, a driven member, a driving armature connected with the driving member, a driven armature electrically connected with the driving armature and mechanically connected with the driven member, a common core for said armatures, a common winding for said core, and an auxiliary field winding adjacent the driven armature for varying the flux density of field and consequently varying flux density of field of the driving armatures inversely and in proportionate amounts.

In testimony whereof, I hereunto affix my signature.

CHARLES E. F. AHLM.